US012754524B2

(12) United States Patent
Waisel et al.

(10) Patent No.: US 12,754,524 B2
(45) Date of Patent: Oct. 6, 2026

(54) SYSTEM AND METHOD OF PRINTING A COLORED THREE-DIMENSIONAL OBJECT

(71) Applicant: STRATASYS LTD., Rehovot (IL)

(72) Inventors: Shai Waisel, Petach Tikva (IL); Yosef Meller, Even Yehuda (IL)

(73) Assignee: STRATASYS LTD., Rehovot (IL)

( * ) Notice: Subject to any disclaimer, the term of this patent is extended or adjusted under 35 U.S.C. 154(b) by 296 days.

(21) Appl. No.: 18/724,993

(22) PCT Filed: Dec. 20, 2022

(86) PCT No.: PCT/IL2022/051355
§ 371 (c)(1),
(2) Date: Jun. 27, 2024

(87) PCT Pub. No.: WO2023/126917
PCT Pub. Date: Jul. 6, 2023

(65) Prior Publication Data

US 2025/0068136 A1 Feb. 27, 2025

Related U.S. Application Data

(60) Provisional application No. 63/294,538, filed on Dec. 29, 2021.

(51) Int. Cl.
*G05B 19/042* (2006.01)
*B33Y 50/00* (2015.01)

(52) U.S. Cl.
CPC ............ *G05B 19/042* (2013.01); *B33Y 50/00* (2014.12)

(58) Field of Classification Search
None
See application file for complete search history.

(56) References Cited

U.S. PATENT DOCUMENTS 10,347,052 B2 * 7/2019 Hemani .................. G06T 19/20
2016/0321838 A1 * 11/2016 Barone .................. G06T 17/00
2017/0358133 A1 12/2017 Iverson et al.

OTHER PUBLICATIONS

Rigiroli, Paolo, et al. "Mesh refinement with color attributes." Computers & Graphics 25.3 (2001): 449-461. (Year: 2001).*
Decoro, Christopher, and Szymon Rusinkiewicz. "Pose-independent simplification of articulated meshes." Proceedings of the 2005 symposium on Interactive 3D graphics and games. 2005. (Year: 2005).*

(Continued)

*Primary Examiner* — Carlos R Ortiz Rodriguez
(74) *Attorney, Agent, or Firm* — PEARL COHEN LLP

(57) ABSTRACT

Systems and methods of printing a colored 3D object, including: receiving an original 3D digital model of a colored 3D object comprising data relating to the geometry and to the color of the 3D object, receiving a printing resolution information relating to a 3D printing device connected to the processor, reducing the amount of data of the original 3D digital model in accordance with the printing resolution of the printing device, a geometric variation threshold and a color variation threshold, thereby generating an approximated 3D digital model of the colored 3D object, and printing the 3D object on the 3D printing device based on the approximated 3D digital model.

20 Claims, 5 Drawing Sheets

(56) References Cited

OTHER PUBLICATIONS

Kim, Hyun Soo, Han Kyun Choi, and Kwan H. Lee. "Mesh simplification with vertex color." International Conference on Geometric Modeling and Processing. Berlin, Heidelberg: Springer Berlin Heidelberg, 2008. (Year: 2008).*

Chen, D., Sitthi-amor, P., Lan, J.T. and Matusik, W. (2013), Computing and Fabricating Multiplanar Models. Computer Graphics Forum, 32: 305-315. https://doi.org/10.1111/cgf.12050 (Year: 2013).*

Liu, Xiuping, et al. "Generating sparse self-supporting wireframe models for 3D printing using mesh simplification." Graphical Models 98 (2018): 14-23. (Year: 2018).*

Anonymous; How to Reduce the File Size of .STL and .OBJ 3D Models; 3D Printing Blog: i.materialise; 3D Printing Blog; Dec. 21, 2019.

Anonymous; Which Texture Resolution for your multicolor 3D prints ?; <<https://.sculpteo.com/blog>> Oct. 2021.

* cited by examiner

SYSTEM AND METHOD OF PRINTING A COLORED THREE-DIMENSIONAL OBJECT

CROSS-REFERENCE TO RELATED APPLICATIONS

This application is a National Phase Application of PCT International Application No. PCT/IL2022/051355, International Filing Date Dec. 20, 2022, claiming the benefit of U.S. Provisional Patent Application No. 63/294,538, filed Dec. 29, 2021 which are hereby incorporated by reference.

FIELD OF THE INVENTION

The present invention relates to printing three-dimensional (3D) objects. More particularly, the present invention relates to systems and methods for printing colored 3D objects.

BACKGROUND

In recent years, numerous technological advancements have become available in the field of three-dimensional (3D) inkjet printing. For 3D inkjet printing, building materials are selectively jetted from one or more print heads and dispensed onto a fabrication tray to form the 3D object, layer-by-layer, according to a pre-determined configuration as defined by a software file.

Building materials may be modeling materials, which are selectively dispensed to produce the 3D object, and support materials (also referred to as "supporting material"), which are selectively dispensed to form support constructions which sustain specific regions of the 3D object during the printing process.

For instance, a support construction may be necessary when the object includes negative angle surfaces, hollows and/or overhangs, and is typically configured to be removed after the printing is complete. For colored 3D inkjet printing, building materials are dispensed to form colored the 3D object.

For printing of complex 3D objects, for instance colored 3D objects having complex or intricate geometries, the generated software file may present a model of the object that is at a higher resolution than is preferable for utilization by the 3D printing system.

It is therefore desirable to reduce the complexity of the model of the 3D object, and accordingly reduce the required computation time for processing and printing the 3D object.

SUMMARY

There is thus provided, according to some embodiments of the invention, a method of printing a colored 3D object, the method including: receiving, by a processor, an original 3D digital model of a colored 3D object including data relating to the geometry and to the color of the 3D object, receiving, by the processor, a printing resolution information relating to a 3D printing device connected to the processor, reducing, by the processor, the amount of data of the original 3D digital model in accordance with the printing resolution of the printing device, a geometric variation threshold and a color variation threshold, thereby generating an approximated 3D digital model of the colored 3D object, and printing the 3D object on the 3D printing device based on the approximated 3D digital model.

In some embodiments, the geometry data of the original 3D digital model includes a series of vertices, edges and faces. In some embodiments, reducing the amount of data of the original 3D digital model includes (i) for each edge of the 3D digital model, calculating the lowest contraction cost, said contraction cost including a combination of a geometric parameter and of a color parameter; (ii) contracting the edge having the lowest combined contraction cost; (iii) adjusting the connected edges accordingly; and (iv) repeating steps (i) to (iii) until a termination condition is satisfied.

In some embodiments, the termination condition is satisfied when (i) the approximated model includes a target reduced number or percentage of faces as compared to the original model; (ii) the lowest edge contraction cost includes a geometric parameter which is above the geometric variation threshold; (iii) the lowest edge contraction cost includes a color parameter which is above the color variation threshold; or (iv) any combination thereof. In some embodiments, reducing the amount of data of the 3D digital model includes contracting all the edges having a length less than the size of a pixel or voxel as defined by the printing resolution.

In some embodiments, the contraction cost includes a value corresponding to a balance indicating the weight ratio between the geometric and the color parameters. some embodiments, the ratio is between 1:100,000 and 100,000:1.

In some embodiments, no edge contraction is made if the two vertices of an edge are located in different texture maps. In some embodiments, the color data of the original 3D digital model corresponds to a color value assigned to each vertex of the 3D digital model, to a texture map, or to both. In some embodiments, where the printing resolution information of the 3D printing device is expressed as a number of pixels per unit of distance or as a number of voxels per unit of distance.

There is thus provided, according to some embodiments of the invention, a system for printing a colored 3D object, the system including: a 3D printing device, including a printing resolution, and a processor, in communication with the 3D printing device, where the processor is configured to: receive an original 3D digital model of a colored 3D object including data relating to the geometry and to the color of the 3D object, receive a printing resolution information relating to the 3D printing device, reduce the amount of data of the original 3D digital model in accordance with the printing resolution of the printing device, a geometric variation threshold and a color variation threshold, thereby generating an approximated 3D digital model of the colored 3D object, and issue a command to the 3D printing device to print the 3D object based on the approximated 3D digital model.

In some embodiments, the geometry data of the original 3D digital model includes a series of vertices, edges and faces. In some embodiments, reducing the amount of data of the original 3D digital model includes (i) for each edge of the 3D digital model, calculating the lowest contraction cost, said contraction cost including a combination of a geometric parameter and of a color parameter; (ii) contracting the edge having the lowest combined contraction cost; (iii) adjusting the connected edges accordingly; and (iv) repeating steps (i) to (iii) until a termination condition is satisfied.

In some embodiments, the termination condition is satisfied when (i) the approximated model includes a target reduced number or percentage of faces as compared to the original model; (ii) the lowest edge contraction cost includes a geometric parameter which is above the geometric variation threshold; (iii) the lowest edge contraction cost includes a color parameter which is above the color variation threshold; or (iv) any combination thereof. In some embodiments, reducing the amount of data of the 3D digital model includes contracting all the edges having a length less than the size of a pixel or voxel as defined by the printing resolution.

In some embodiments, the contraction cost includes a value corresponding to a balance indicating the weight ratio between the geometric and the color parameters. In some embodiments, the ratio is between 1:100,000 and 100,000:1. In some embodiments, no edge contraction is made if the two vertices of an edge are located in different texture maps.

In some embodiments, the color data of the original 3D digital model corresponds to a color value assigned to each vertex of the 3D digital model, to a texture map, or to both. In some embodiments the printing resolution information of the 3D printing device is expressed as a number of pixels per unit of distance or as a number of voxels per unit of distance.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1:
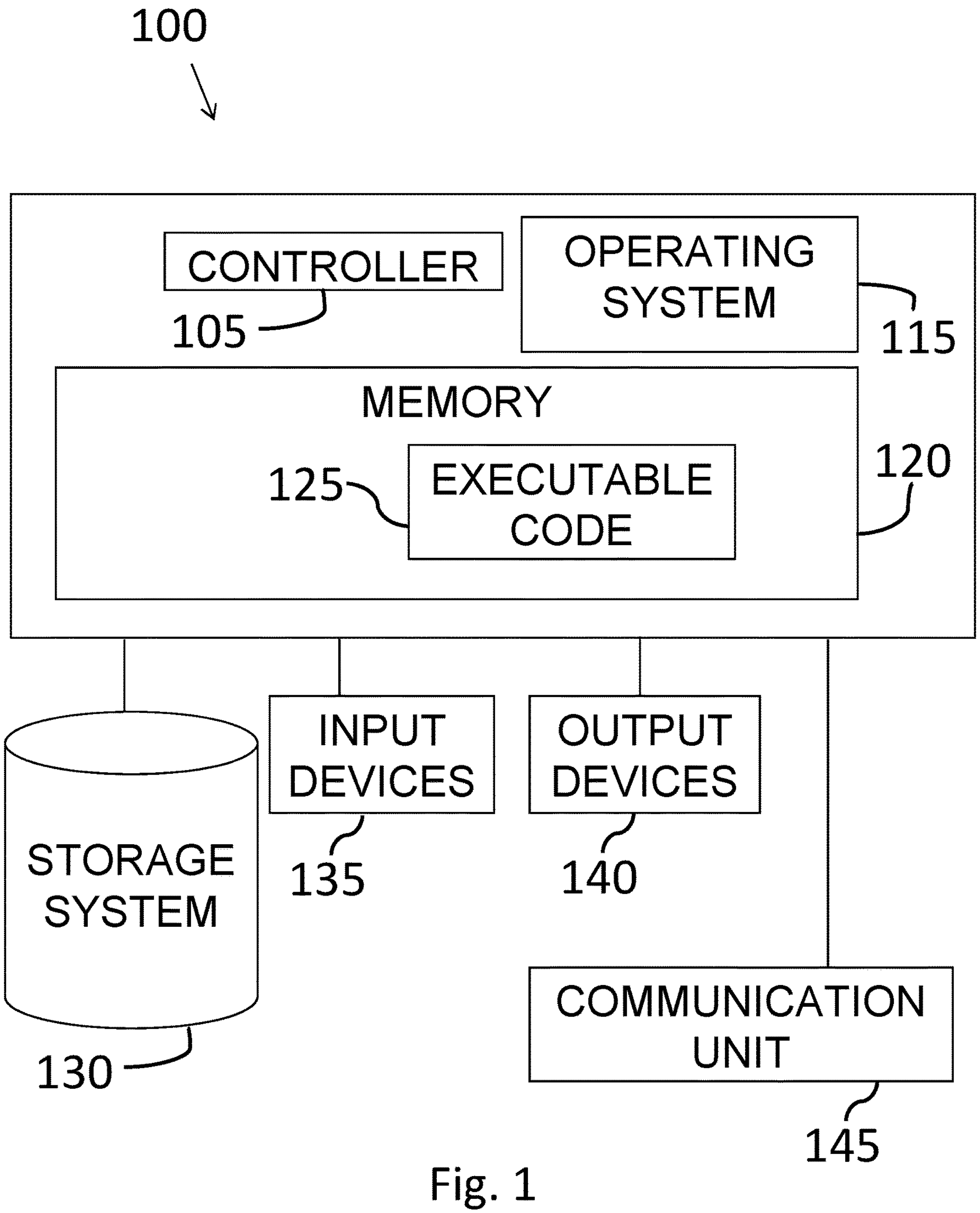
FIG. 1 shows a block diagram of a computing device, according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention.

Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items.

Unless explicitly stated, the method embodiments described herein are not constrained to a particular order or sequence. Additionally, some of the described method embodiments or elements thereof may occur or be performed simultaneously, at the same point in time, or concurrently.

Reference is made to FIG. 1, which is a block diagram of an example computing device, according to some embodiments of the invention.

Computing device 100 may include a controller or processor 105 (e.g., a central processing unit processor (CPU), a chip or any suitable computing or computational device), an operating system 115, memory 120, executable code 125, storage 130, input devices 135 (e.g. a keyboard or touchscreen), and output devices 140 (e.g., a display), a communication unit 145 (e.g., a cellular transmitter or modem, a Wi-Fi communication unit, or the like) for communicating with remote devices via a communication network, such as, for example, the Internet.

Controller 105 may be configured to execute program code to perform operations described herein. The system described herein may include one or more computing device(s) 100, for example, to act as the various devices or the components shown in FIG. 3. For example, controller 105 may be configured to communicate with a printing device that is connected to the controller 105.

Operating system 115 may be or may include any code segment (e.g., one similar to executable code 125 described herein) designed and/or configured to perform tasks involving coordinating, scheduling, arbitrating, supervising, controlling or otherwise managing operation of computing device 100, for example, scheduling execution of software programs or enabling software programs or other modules or units to communicate.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units.

Memory 120 may be or may include a plurality of similar and/or different memory units. Memory 120 may be a computer or processor non-transitory readable medium, or a computer non-transitory storage medium, e.g., a RAM.

Executable code 125 may be any executable code, e.g., an application, a program, a process, task or script. Executable code 125 may be executed by controller 105 possibly under control of operating system 115. For example, executable code 125 may be a software application that performs methods as further described herein.

Although, for the sake of clarity, a single item of executable code 125 is shown in FIG. 1, a system according to embodiments of the invention may include a plurality of executable code segments similar to executable code 125 that may be stored into memory 120 and cause controller 105 to carry out methods described herein.

Storage 130 may be or may include, for example, a hard disk drive, a universal serial bus (USB) device or other suitable removable and/or fixed storage unit. In some embodiments, some of the components shown in FIG. 1 may be omitted. For example, memory 120 may be a non-volatile memory having the storage capacity of storage 130. Accordingly, although shown as a separate component, storage 130 may be embedded or included in memory 120.

Input devices 135 may be or may include a keyboard, a touch screen or pad, one or more sensors or any other or additional suitable input device. Any suitable number of input devices 135 may be operatively connected to computing device 100. Output devices 140 may include one or more displays or monitors and/or any other suitable output devices.

Any suitable number of output devices 140 may be operatively connected to computing device 100. Any applicable input/output (I/O) devices may be connected to computing device 100 as shown by blocks 135 and 140. For example, a wired or wireless network interface card (NIC), a universal serial bus (USB) device or external hard drive may be included in input devices 135 and/or output devices 140.

Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

For example, an article may include a storage medium such as memory 120, computer-executable instructions such as executable code 125 and a controller such as controller 105. Such a non-transitory computer readable medium may be for example a memory, a disk drive, or a USB flash memory, encoding, including or storing instructions, e.g., computer-executable instructions, which when executed by a processor or controller, carry out methods disclosed herein.

The storage medium may include, but is not limited to, any type of disk including, semiconductor devices such as read-only memories (ROMs) and/or random-access memories (RAMs), flash memories, electrically erasable programmable read-only memories (EEPROMs) or any type of media suitable for storing electronic instructions, including programmable storage devices. For example, in some embodiments, memory 120 is a non-transitory machine-readable medium.

A system according to embodiments of the invention may include components such as, but not limited to, a plurality of central processing units (CPUs), a plurality of graphics processing units (GPUs), or any other suitable multi-purpose or specific processors or controllers (e.g., controllers similar to controller 105), a plurality of input units, a plurality of output units, a plurality of memory units, and a plurality of storage units. A system may additionally include other suitable hardware components and/or software components.

In some embodiments, a system may include or may be, for example, a personal computer, a desktop computer, a laptop computer, a workstation, a server computer, a network device, or any other suitable computing device.

For example, a system as described herein may include one or more facility computing device 100 and one or more remote server computers in active communication with one or more facility computing device 100 such as computing device 100, and in active communication with one or more portable or mobile devices such as smartphones, tablets and the like.

According to some embodiments, systems and methods are provided for mesh simplification of 3D printing object models. The simplification may include a sequence of local updates to the mesh (e.g., reducing a vertex), where each update may reduce the size of the mesh and/or decrease the approximation precision of the 3D model.

For mesh simplification, in some embodiments of the invention, the Quadric Error Metrics approach is applied in order to maintain high fidelity to the original 3D model (e.g., prior to the simplification). Each vertex in the mesh may be connected to 'N' triangles, and therefore the vertex has zero distance from all planes defined by these 'N' triangles. Considering a movement of such a vertex, the total distances from the planes may be larger than zero.

A symmetric 4×4 matrix 'Q' may be defined as square of distances from the planes. For each edge 'E', the matrix 'Q' may be calculated for a pair of vertices with the goal of minimizing 'Q'.

Figure 2:
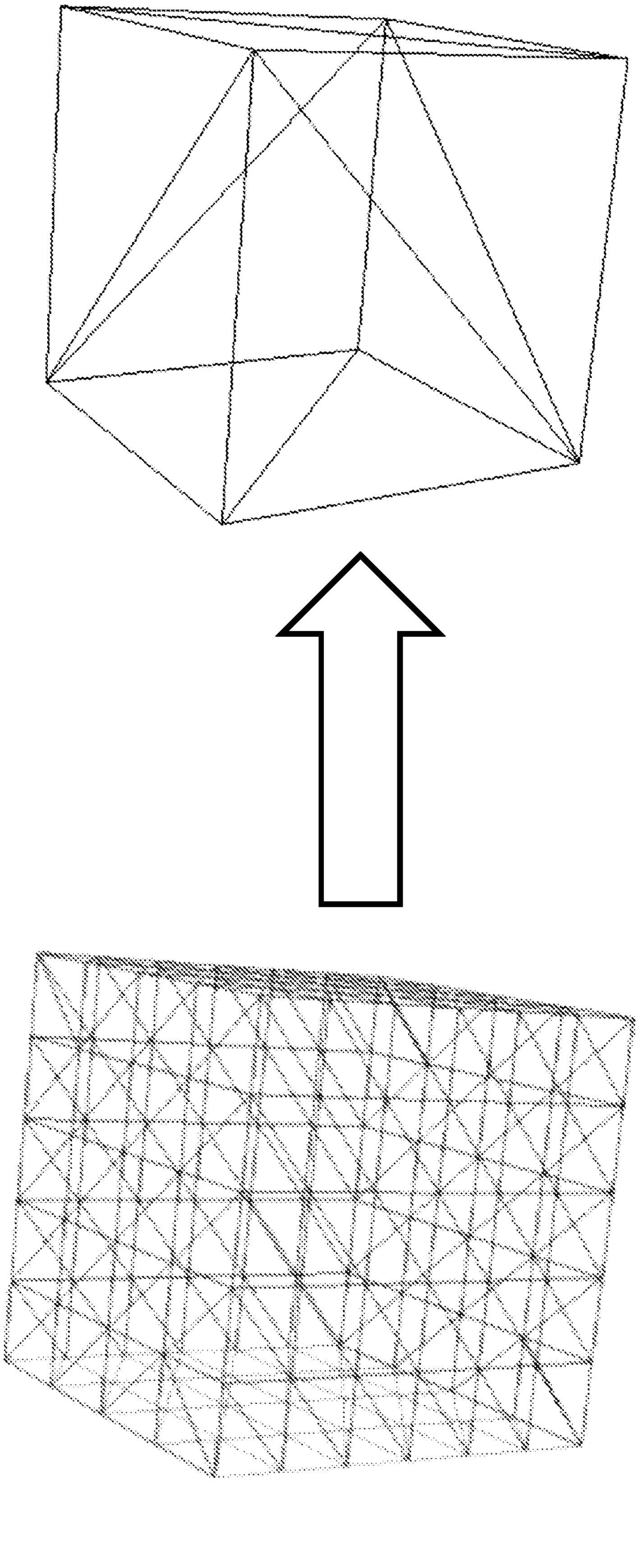
FIG. 2 illustrates simplification of a mesh of a 3D object, according to some embodiments of the invention.

Reference is now made to FIG. 2, which illustrates simplification of a mesh of a 3D object, according to some embodiments of the invention. A 3D digital model may be represented by a plurality of triangles forming the 3D mesh, and the geometry of the 3D digital model may be simplified by reducing the number of triangles.

The size of a triangle may give power relative to the triangle area, where lower 'Q' may indicate that removing an edge result in a lower influence on the original geometry. Accordingly, the lowest 'Q' edge may be contracted to adjust the corresponding mesh.

According to some embodiments, in addition to the geometrical simplification of the 3D mesh, colors may be simplified as well. For example, a color distance may be represented by Euclidean (or other) change in the colors Green, Red and Blue: $CD=\sqrt{(\Delta R^2+\Delta G^2+\Delta B^2)}$.

In order to carry out the color simplification, a color tolerance may be defined, for instance a scalar value corresponding to the color distance 'CD'. In some embodiments, for an input of mesh vertices, X/Y/Z coordinates and RGB colors, the color tolerance may be applied to generate the simplified 3D mesh. For example, calculation of the mesh simplification may consider at least one of: final number of faces, geometrical tolerance and color tolerance. In some embodiments, color conventions other than RGB may be used. For example, at least one of the following may be utilized: CIELAB (a color space defined by the International Commission on Illumination where "L" relates to lightness, "A" relates to red/green and "B" relates to blue/yellow), HEX (a 6-symbol code to express color values), HSL (hue, saturation, and lightness), CMYK (Cyan, Magenta, Yellow, and Black colors used for printing), and RGB.

Figure 3:
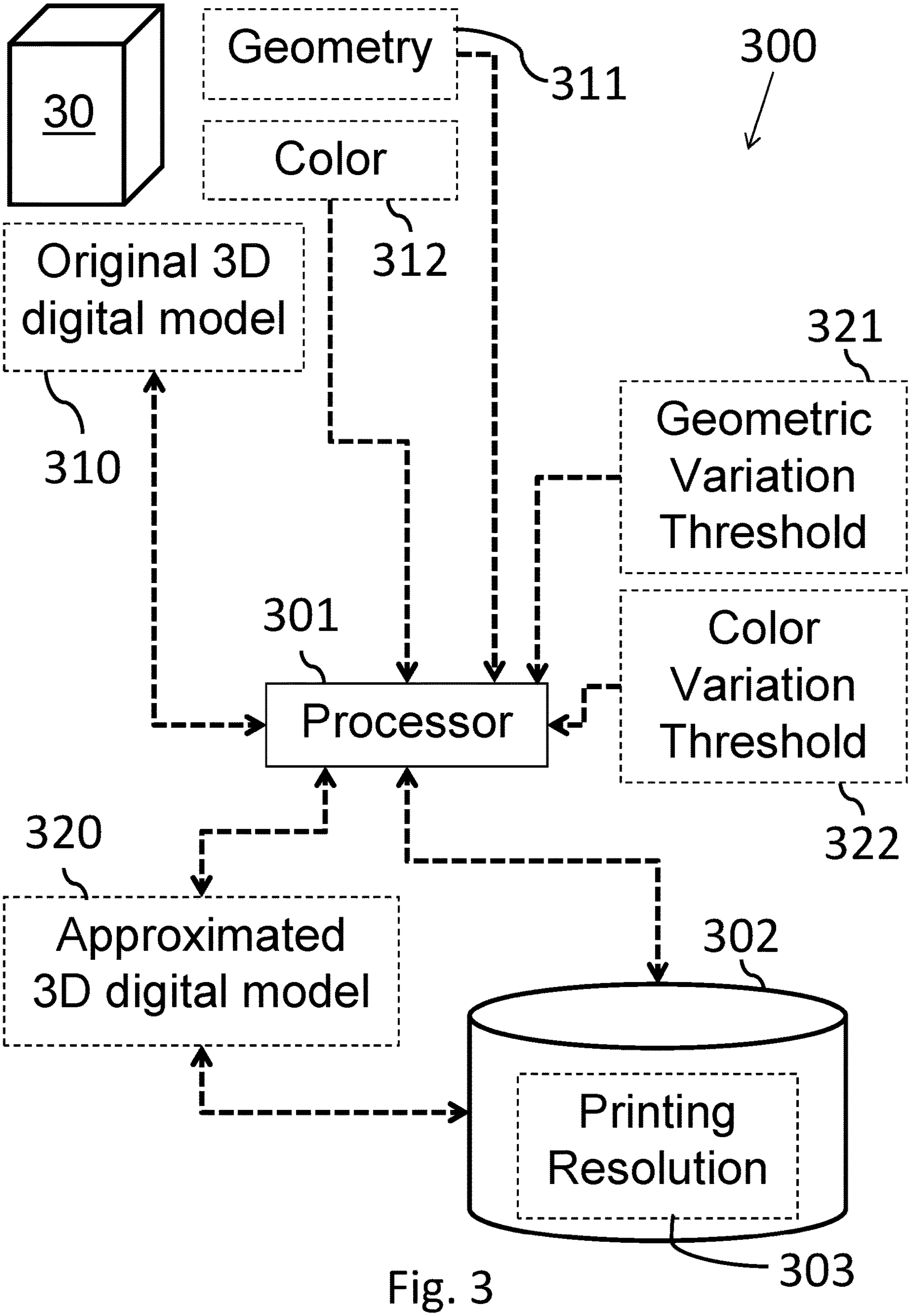
FIG. 3 shows a block diagram of a system for 3D printing, according to some embodiments of the invention.

Reference is now made to FIG. 3, which shows a block diagram of a system for 3D color printing 300, according to some embodiments of the invention. In FIG. 3, hardware elements are indicated with a solid line and the direction of arrows indicate a direction of information flow between the hardware elements.

For printing a 3D object 30, dedicated information may be retrieved for a 3D digital model 310 of the 3D object 30. In some embodiments, a processor 301 (e.g., similarly to controller 105 shown in FIG. 1) may receive the original 3D digital model 310 of the 3D object 30, for printing with a 3D printing device 302. For example, the processor 301 may receive the original 3D digital model 310 as a dedicated file for 3D printing.

The original 3D digital model 310 may include data relating to the geometry 311 and to the color 312 of the 3D object 30. For example, the original 3D digital model 310 may include a data vector with X/Y/Z coordinates and RGB colors. The original 3D digital model 310 may include geometry data 311 associated with vertices, edges and/or faces of the mesh of the 3D digital model.

In some embodiments, the color data 312 of the original 3D digital model 310 may correspond to a color value assigned to each vertex of the 3D digital model 310, and/or to a texture map.

For example, a texture map may include texture information for each point in the 3D digital model, such that texture constraints (i.e. color constraints) are taken into account during the modification of the model. In some embodiments, no edge contraction is made if the two vertices of an edge are located in two different texture maps.

In some embodiments, the color data 312 may include transparency data as additional values to the color.

The processor 301 may further receive a printing resolution information 303 relating to a 3D printing device 302, in order to simplify the resolution of the original 3D digital model 310 to suit the printing resolution information 303.

In some embodiments, the printing resolution information 303 of the 3D printing device 302 may be expressed as a number of pixels per unit of distance or as a number of voxels per unit of distance. In some embodiments, the processor 301 may calculate a maximal displacement to the received 3D digital model for each iteration of the mesh simplification.

According to some embodiments, the processor 301 may "simplify" or reduce the amount of data of the original digital model 310 in accordance with the printing resolution 303 of the printing device 320, a geometric variation threshold 321 (e.g., a predefined number of faces to keep at the mesh) and a color variation threshold 322 (e.g., a threshold for color values at each vertex).

For example, the color variation threshold 322 may indicate that mesh contraction resulting in color difference exceeding a predefined threshold may not be validated.

Accordingly, the processor 301 may generate an approximated 3D digital model 320 of the colored 3D object 30. In some embodiments, the processor 301 may calculate for each point in the mesh the result of the reduction (e.g., removal of a vertex) and check if the reduction exceeds the geometric variation threshold 321 and/or the color variation threshold 322.

In some embodiments, the processor 301 may define a plurality of shells of the geometry 311 of the original 3D digital model by a bounding box, and/or offsetting at least one of one or more edges, one or more vertices, or one or more faces of the bounding box, inwardly or outwardly, in the same manner or independently of one another.

In some embodiments, reducing the amount of data of the 3D digital model 310 may include contracting all the edges having a length less than the size of a pixel or voxel as defined by the printing resolution 303.

For example, the processor 301 may calculate a combined geometry cost and color cost function, for triangle coordinates (X,Y,Z,R,G,B) on a geometry/color plane. The squared distance of any point on the triangle (e.g., a vertex) to that plane may be calculated to determine if the variation threshold is reached (e.g., at edges of the mesh) with the modified or approximated 3D digital model. Additional predefined conditions on the approximated 3D digital model may include forbidding contraction of boundary edges, and/or minimizing texture distortions by vertex movement.

According to some embodiments, reducing the amount of data of the original 3D digital model 310 may include for each edge of the 3D digital model 310, calculation by the processor 301 of the lowest contraction cost, said contraction cost including a combination of a geometric parameter and of a color parameter.

In some embodiments, the processor 301 may further contract the edge having the lowest combined contraction cost. In some embodiments, the processor 301 may further adjust the connected edges accordingly. In some embodiments, the processor 301 may further repeat the above steps until a termination condition is satisfied. For example, the termination condition may include a minimal number of faces associated with the printing resolution 303.

In some embodiments, the termination condition is satisfied for at least one of: the approximated model includes a target reduced number or percentage of faces as compared to the original model, and/or the lowest edge contraction cost includes a geometric parameter which is above the geometric variation threshold, and/or the lowest edge contraction cost includes a color parameter which is above the color variation threshold.

In some embodiments, the contraction cost includes a value corresponding to a balance indicating the weight ratio between the geometric and the color parameters. For example, the ratio may be between 1:100,000 and 100,000:1.

In some embodiments, the processor 301 may issue a command to the printing device 302 to print the "simplified" or approximated 3D object on the 3D printing device based on the approximated 3D digital model.

Figure 4:
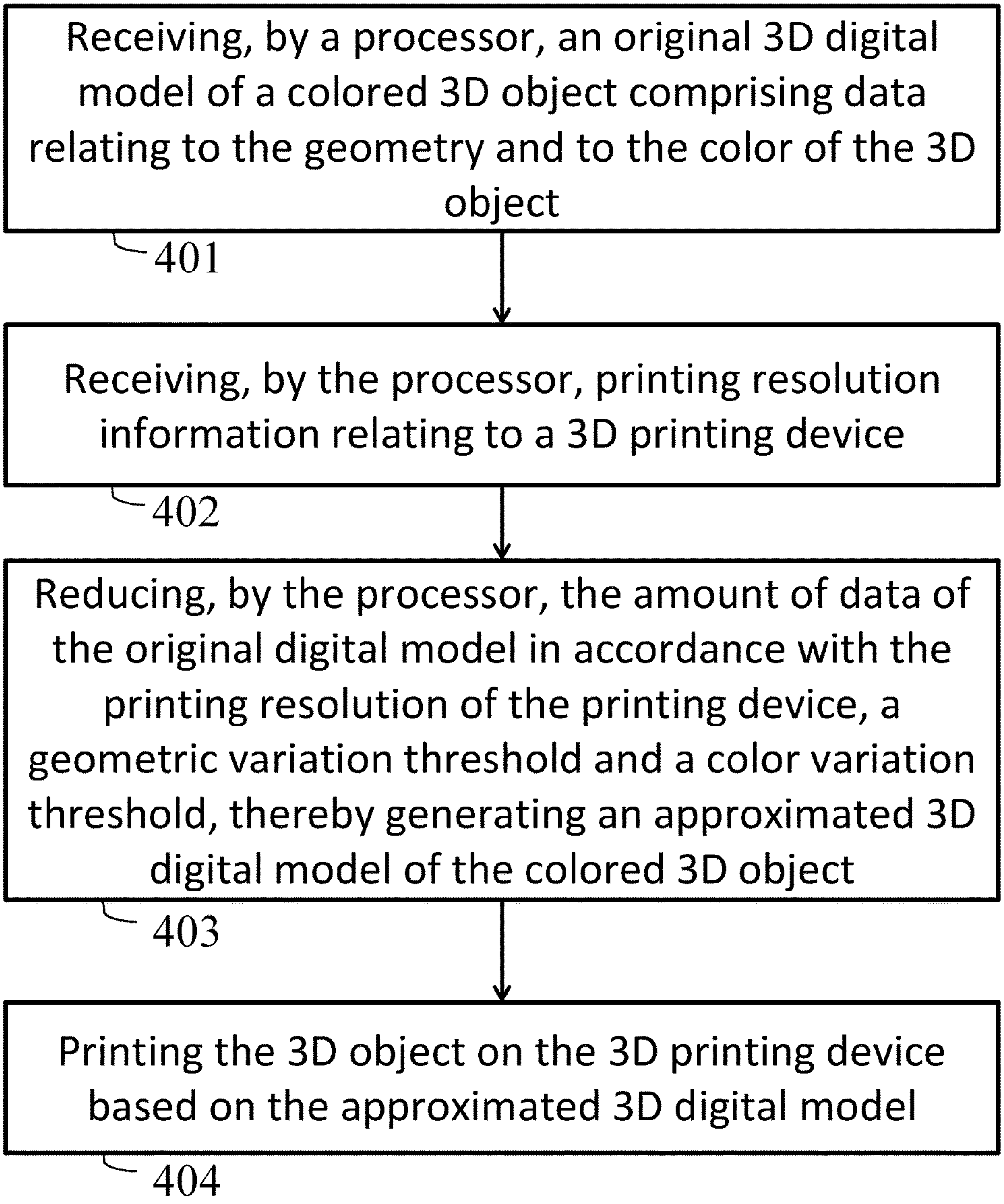
FIG. 4 shows a flowchart of a method of printing a colored 3D object, according to some embodiments of the invention.

Reference is now made to FIG. 4, which shows a flowchart of a method of printing a colored 3D object, according to some embodiments of the invention.

In Step 401, an original 3D digital model of a colored 3D object is received (e.g., by the processor), the 3D digital model including data relating to the geometry and to the color of the 3D object.

In Step 402, a printing resolution information is received (e.g., by the processor), relating to a 3D printing device.

In Step 403, the amount of data of the original 3D digital model may be reduced (e.g., by the processor), in accordance with the printing resolution of the printing device, a geometric variation threshold and a color variation threshold, thereby generating an approximated 3D digital model of the colored 3D object.

In Step 404, the 3D object may be printed on the 3D printing device based on the approximated 3D digital model.

Figure 5A:
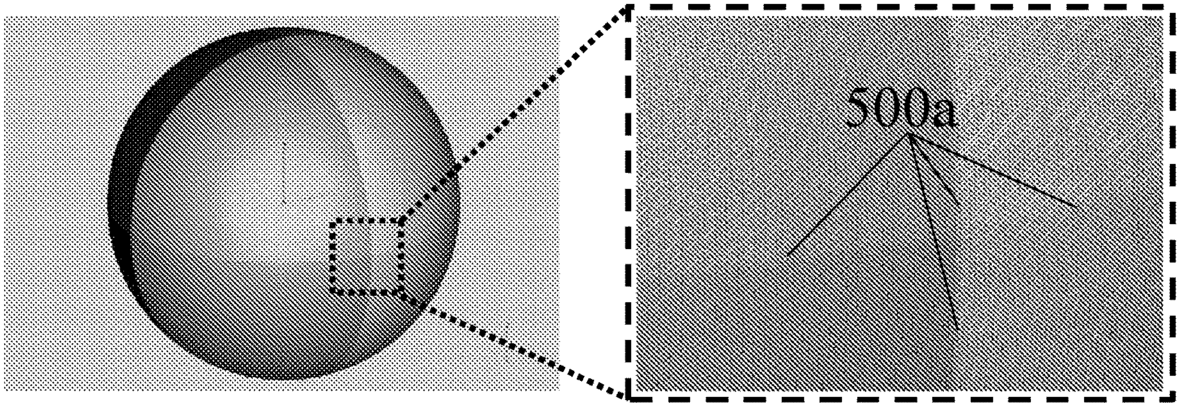
FIGS. 5A-5C show pictures of a 3D digital model of a colored 3D object and zoom-in pictures of some regions of the 3D digital model, according to some embodiments of the invention.
Figure 5B:
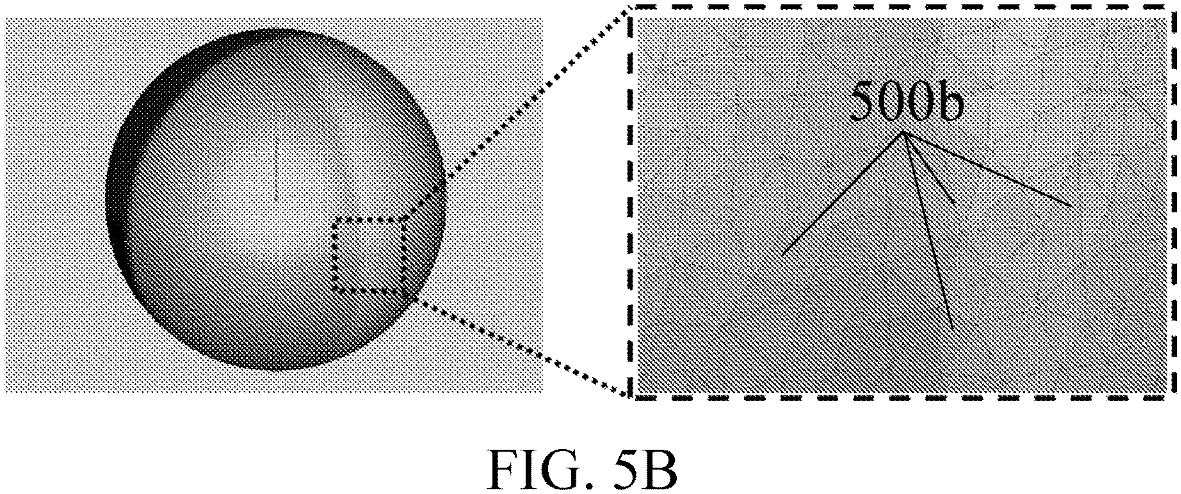
Figure 5C:
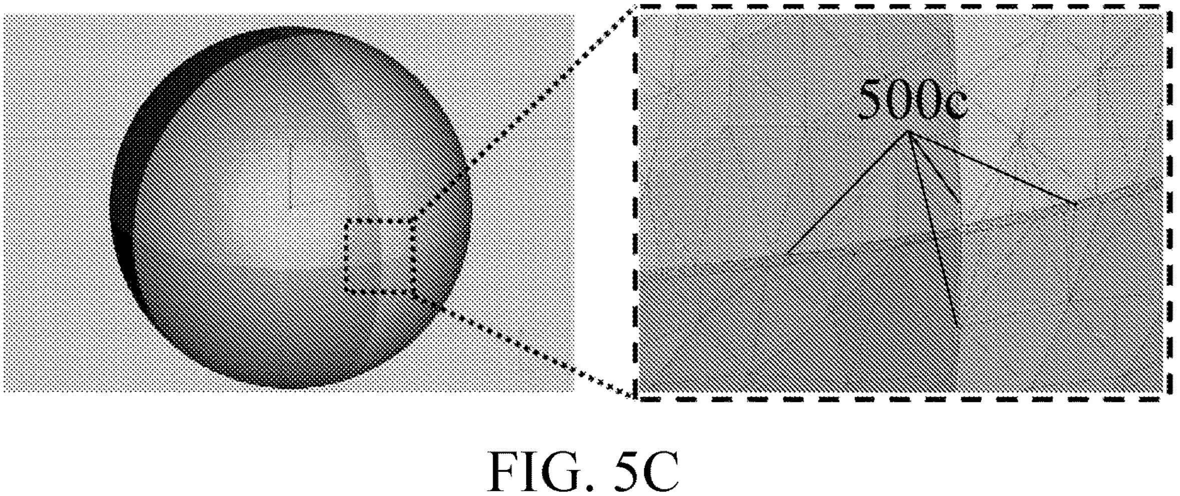

Reference is now made to FIGS. 5A-5C, which show pictures of a 3D digital model of a colored 3D object and zoom-in pictures of some regions of the 3D digital model, according to some embodiments of the invention. For simplification, the different colors appear herewith with different gray intensities.

FIG. 5A shows the original 3D digital model of the colored 3D object. The original 3D digital model includes data relating to the geometry and to the color of the 3D object, with 1,300,000 triangles of the mesh. Sharp color transition lines 500*a* appear between the different colors of the original 3D digital model, which is enabled by the high overall resolution (i.e. numbers of triangles) of the 3D model.

FIGS. 5B and 5C show approximated 3D digital models of the colored 3D object, with about 13,000 triangles as a result of a simplification processing. One of the main differences between FIG. 5B and FIG. 5C is that a color constraint is applied to compute the approximated model of FIG. 5C, while in the other case (FIG. 5B) no color constraint has been taken into account. As a result, the shape, size and position of some triangles of FIG. 5C, especially at the boundaries of the color regions, are different compared to the triangles of FIG. 5B. This results in sharper color transition lines 500*c* (FIG. 5C) which are very close to those of the original 3D model, while blurry color transition lines 500*b* (FIG. 5B) are obtained if no color constraint is considered during the simplification process.

While certain features of the invention have been illustrated and described herein, many modifications, substitutions, changes, and equivalents may occur to those skilled in the art. It is, therefore, to be understood that the appended claims are intended to cover all such modifications and changes.

Various embodiments have been presented. Each of these embodiments may of course include features from other embodiments presented, and embodiments not specifically described may include various features described herein.

The invention claimed is:

1. A method of printing a colored 3D object, the method comprising:

receiving, by a processor, an original 3D digital model of a colored 3D object comprising data relating to the geometry and to the color of the 3D object;

receiving, by the processor, a printing resolution information relating to a 3D printing device connected to the processor;

reducing, by the processor, the amount of data of the original 3D digital model in accordance with the printing resolution of the printing device, a geometric variation threshold and a color variation threshold, thereby generating an approximated 3D digital model of the colored 3D object; and printing the 3D object on the 3D printing device based on the approximated 3D digital model.

2. The method of claim 1, wherein the geometry data of the original 3D digital model comprises a series of vertices, edges and faces.

3. The method of claim 2, wherein reducing the amount of data of the original 3D digital model comprises (i) for each edge of the 3D digital model, calculating the lowest contraction cost, said contraction cost comprising a combination of a geometric parameter and of a color parameter; (ii) contracting the edge having the lowest combined contraction cost; (iii) adjusting the connected edges accordingly; and (iv) repeating steps (i) to (iii) until a termination condition is satisfied.

4. The method of claim 3, wherein the termination condition is satisfied when (i) the approximated model comprises a target reduced number or percentage of faces as compared to the original model; (ii) the lowest edge contraction cost comprises a geometric parameter which is above the geometric variation threshold; (iii) the lowest edge contraction cost comprises a color parameter which is above the color variation threshold; or (iv) any combination thereof.

5. The method of claim 2, wherein reducing the amount of data of the 3D digital model comprises contracting all the edges having a length less than the size of a pixel or voxel as defined by the printing resolution.

6. The method of claim 2, wherein the contraction cost comprises a value corresponding to a balance indicating the weight ratio between the geometric and the color parameters.

7. The method of claim 6, wherein the ratio is between 1:100,000 and 100,000:1.

8. The method of claim 3, wherein no edge contraction is made if the two vertices of an edge are located in different texture maps.

9. The method of claim 1, wherein the color data of the original 3D digital model corresponds to a color value assigned to each vertex of the 3D digital model, to a texture map, or to both.

10. The method of claim 1, wherein the printing resolution information of the 3D printing device is expressed as a number of pixels per unit of distance or as a number of voxels per unit of distance.

11. A system for printing a colored 3D object, the system comprising:

a 3D printing device, comprising a printing resolution; and a processor, in communication with the 3D printing device, wherein the processor is configured to:

receive an original 3D digital model of a colored 3D object comprising data relating to the geometry and to the color of the 3D object;

receive a printing resolution information relating to the 3D printing device;

reduce the amount of data of the original 3D digital model in accordance with the printing resolution of the printing device, a geometric variation threshold and a color variation threshold, thereby generating an approximated 3D digital model of the colored 3D object; and issue a command to the 3D printing device to print the 3D object based on the approximated 3D digital model.

12. The system of claim 11, wherein the geometry data of the original 3D digital model comprises a series of vertices, edges and faces.

13. The system of claim 12, wherein reducing the amount of data of the original 3D digital model comprises (i) for each edge of the 3D digital model, calculating the lowest contraction cost, said contraction cost comprising a combination of a geometric parameter and of a color parameter; (ii) contracting the edge having the lowest combined contraction cost; (iii) adjusting the connected edges accordingly; and (iv) repeating steps (i) to (iii) until a termination condition is satisfied.

14. The system of claim 13, wherein the termination condition is satisfied when (i) the approximated model comprises a target reduced number or percentage of faces as compared to the original model; (ii) the lowest edge contraction cost comprises a geometric parameter which is above the geometric variation threshold; (iii) the lowest edge contraction cost comprises a color parameter which is above the color variation threshold; or (iv) any combination thereof.

15. The system of claim 12, wherein reducing the amount of data of the 3D digital model comprises contracting all the edges having a length less than the size of a pixel or voxel as defined by the printing resolution.

16. The system of claim 12, wherein the contraction cost comprises a value corresponding to a balance indicating the weight ratio between the geometric and the color parameters.

17. The system of claim 16, wherein the ratio is between 1:100,000 and 100,000:1.

18. The system of claim 17, wherein no edge contraction is made if the two vertices of an edge are located in different texture maps.

19. The system of claim 11, wherein the color data of the original 3D digital model corresponds to a color value assigned to each vertex of the 3D digital model, to a texture map, or to both.

20. The system of claim 11, wherein the printing resolution information of the 3D printing device is expressed as a number of pixels per unit of distance or as a number of voxels per unit of distance.

* * * * *